United States Patent
Mitra et al.

(10) Patent No.: US 9,223,571 B2
(45) Date of Patent: Dec. 29, 2015

(54) METHOD AND SYSTEM FOR ANALYZING AN EXTENT OF SPEEDUP ACHIEVABLE FOR AN APPLICATION IN A HETEROGENEOUS SYSTEM

(71) Applicant: Infosys Limited, Bangalore (IN)

(72) Inventors: Sayantan Mitra, Kolkata (IN); Santonu Sarkar, Bangalore (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 14/614,226

(22) Filed: Feb. 4, 2015

(65) Prior Publication Data

US 2015/0220335 A1    Aug. 6, 2015

(30) Foreign Application Priority Data

Feb. 5, 2014  (IN) .............................. 532/CHE/2014

(51) Int. Cl.
| | |
|---|---|
| G06F 9/44 | (2006.01) |
| G06F 9/54 | (2006.01) |
| G06F 9/45 | (2006.01) |
| G06F 11/34 | (2006.01) |

(52) U.S. Cl.
CPC G06F 8/77 (2013.01); G06F 8/443 (2013.01); G06F 8/71 (2013.01); G06F 9/54 (2013.01); G06F 11/34 (2013.01)

(58) Field of Classification Search
CPC .................................. G06F 8/71; G06F 8/443
USPC ......................................... 717/120, 153, 154
See application file for complete search history.

(56) References Cited

U.S. PATENT DOCUMENTS

| | | | |
|---|---|---|---|
| 5,450,554 A | 9/1995 | Zaiki | |
| 2005/0193184 A1* | 9/2005 | Kohno | G06F 17/5045 712/1 |
| 2014/0068235 A1* | 3/2014 | Nightingale | G06F 9/44573 713/1 |
| 2014/0068240 A1* | 3/2014 | Nightingale | G06F 9/44557 713/2 |

OTHER PUBLICATIONS

Sharma et al., "Performance Antipatterns: Detection and Evaluation of their Effects in the Cloud", 2014.*
Kim et al., "SD3: A Scalable Approach to Dynamic Data-Dependence Profiling", 2010.*
K. Valkenburgh, "Measuring and Improving the Potential Parallism of Sequential Java Programs", 2009.*

(Continued)

*Primary Examiner* — Phillip H Nguyen
(74) *Attorney, Agent, or Firm* — Klarquist Sparkman, LLP

(57) ABSTRACT

The present disclosure includes, in a heterogeneous system, receiving a desired speedup of an application as input and performing a static analysis and a dynamic analysis of the application. The dynamic analysis of the application comprises, identifying a set of parameters including, an end-to-end execution time of the application, an execution time of data parallel loops in the application, an execution time of non-data parallel loops in the application, and an amount of physical memory used by each data structure in each data parallel loop. Dynamic analysis also includes calculating and providing the feasibility of achieving the desired speedup of the application based on the identified set of parameters, and satisfaction of each of, an initialization invariant, a data-parallel invariant and a data transfer invariant.

21 Claims, 5 Drawing Sheets

(56) References Cited

OTHER PUBLICATIONS

Kim et al., "Predicting Potential Speedup of Serial Code via Lightweight Profiling and Emulations with Memory Performance Model," Georgia Institute of Technology, Atlanta, Georgia, http://www.cc.gatech.edu/~hyesoon/kim_ipdps12.pdf, retrieved Jan. 28, 2015, 12 pages.

Boyer et al., "Improving GPU Performance Prediction with Data Transfer Modeling," Argonne National Laboratory, University of Virginia, http://www.cs.virginia.edu/~mwb7w/publications/ASHES_13_data_transfer_modeling.pdf, retrieved Jan. 28, 2015, 10 pages.

Jeon et al., "Parkour: Parallel Speedup Estimates for Serial Programs," University of California, San Diego http://static.usenix.org/event/hotpar11/tech/final_files/Jeon.pdf, retrieved Jan. 28, 2015, 6 pages.

El-Nashar, "To Parallelize or Not to Parallelize, Speed Up Issue," International Journal of Distributed and Parallel Systems (IJDPS), vol. 2, No. 2, Mar. 2011, 15 pages.

"Intel® Advisor XE," software.intel.com, Aug. 22, 2013, 4 pages.

\* cited by examiner

FIGURE 1 (PRIOR-ART)

METHOD AND SYSTEM FOR ANALYZING AN EXTENT OF SPEEDUP ACHIEVABLE FOR AN APPLICATION IN A HETEROGENEOUS SYSTEM

FIELD

A method system and computer readable medium for analyzing an extent of speedup achievable for an application in a heterogeneous system.

BACKGROUND

Over the years, GPUs have evolved into a computational workhorse for embarrassingly data-parallel computations. Together with the CPU they form a heterogeneous computing model wherein sequential part of the application runs on the CPU while the data parallel portion of the code is executed on the GPU. Compared to traditional high performance computing solutions, GPU computing provides massive data parallel hardware at a fraction of that cost. However building a parallel application as used in areas such as finance, seismology etc. is not easy. Even after the advent of the Compute Unified Device Architecture (CUDA) programming platform, it still takes considerable effort on the part of an application programmer to write a highly optimized GPU kernel. Further, there aren't any tools that can assist developers to transform a sequential code to a highly optimized GPU ready version. Hence it is essential to build such tools that will assist a developer to transform a sequential code to SIMT and gain significant speedups without having to worry much about the underlying GPU architecture on which the code would execute. Currently, to build such a tool, an elaborate analysis of the run time of the code is essential. Clients/customers typically make available only a partial version of the entire sequential implementation to IT service vendors who want to do such an analysis.

The current scenario in co-processor development domain is that Intel and AMD are working on their next generation of processors that have highly powerful CPU clusters and vector processors. For instance, Intel's latest Sandybridge, Ivy-bridge and Haswell CPUs are all Xeon based processors which can perform vector operations. The most advanced of this series is called Xeon Phi which is a vector co-processor that works in conjunction with the CPU through a PCIe bus. From this perspective, the Xeon Phi architecture is quite similar to a Xeon class CPU and a GPU co-processor.

Intel makes use of a tool called Intel Parallel Studio which tries to help developers identify parallel portions of a code and what could be the potential performance gain if they run the program on 2, 4, 8 or 16 cores. The tool also helps identify memory and threading errors. However Intel Parallel Studio does not have any feature to estimate that given a single threaded program, what should be the speedup necessary from each data parallel portion of the code, so as to give a certain amount of overall speedup of the program, end to end. The tool also does not have any feature to evaluate the overall speedup of the code taking into account data communication costs via the PCIe bus.

As far as processors from AMD are concerned, there are two types. One being the APU and the other the GPU. The AMD GPU is a co-processor to the CPU and communicates via the PCIe bus. So the communication latencies that are there with Xeon Phi and NVIDIA GPUs are there with AMD GPUs too. With AMD APUs, AMD has brought graphics capabilities to the desktop processor. The latest in this class is the Kaveri APU that was unveiled in January, 2014. With this architecture, CPU and GPU are able to access the same memory address space. The GPU can access cache data from coherent memory regions in the system memory, and also reference the data from CPU's cache. So cache coherency is maintained. The GPU is also able to take advantage of the shared virtual memory between CPU and GPU, and system page memory can now be referenced directly by the GPU, instead of being copied or pinned before accessing. The limitations are that the maximum memory throughput is limited to about 51.2 GB/s. Though it improves graphics capabilities of desktop processors, such memory throughput is quite low when compared to NVIDIA's co-processors (177 GB/s for GTX 480 Fermi and 208 GB/s for Kepler K20) or Intel's Xeon Phi. AMD has come up with Accelerated Parallel Processing SDK (APP SDK), which also helps developers to identify performance bottlenecks in the OpenCL code. So this is similar to NVIDIA's parallel Nsight or CUDA Visual Profiler which comes into play after a basic version of the parallel code has been written. However both AMD APP, NVidia Parallel Nsight assumes that one has already ported or (newly developed) an application for the underlying platform. As the application runs, the tool collects various runtime profile information and provides different insights. These tools have no capability to predict the speedup before porting.

Limitations of the existing technology range from non-availability of data to lack of a proper approach in handling such scenarios. The same is explained in further detail here below.

Non-availability of test data for dynamic analysis: performing a run time analysis on a partial implementation using limited test input does not always give a correct analysis. Further due to business demands, it is not always possible for a client/customer to undertake a proper run time analysis of an entire sequential implementation.

Inaccuracy of static analysis: On the other hand a static analysis can't predict the complexity of the program that is data dependent. Therefore, the analysis may not always be accurate.

Non-availability of code: The tools available for program analysis for parallelization assume that the programmer is to run the tools on the entire piece of sequential code. In business, often the owner of the sequential code is not available or competent for such analysis and expects an external expert to perform the analysis on the owner's behalf. Furthermore, the owner does not want the code to leave the premise. Consequently, it becomes a costly proposition for the owner to perform such an analysis on premise by a third party expert. As a result, owners often do not undertake such an exercise and try to port existing code with minimal changes onto the new platform like GPU. Obviously, this approach does not lead to optimal exploitation of the data-parallel infrastructure.

Holistic analysis approach is missing: In order to accurately analyze a code for parallelism, it is essential to consider different dimensions. These being: loop complexity, loop volume, understanding the nature of the input data that the program is supposed to handle, and nature of the program variables. A loop complexity analysis can indicate the amount of control flow complexity that exists inside the loop and if it is worth parallelizing. A loop volume estimation tells us how many times this loop will be executed. The nature of the input data can often give important clues regarding the run-time behavior of the application, specifically, how the control paths will be executed. In absence of real data, the nature of data plays an important role. The nature of program variables can give important hints related to optimal usage of memory.

All the tools that deal with the above aspect, work in silo. Unless they are properly integrated where they interact with each other and influence each other's analysis, the overall analysis will not be effective. All the leading platform vendors as well as researchers acknowledge that there should be enough supporting tools to assist the application developer to build efficient code that can exploit the underlying hardware's processing power.

In essence, the state of the art has the following limitations.
i) Inaccurate estimation;
ii) Ad-hoc strategy to port;
iii) Massive effort to even port a simple version; and
iv) Discovery of latency, and data-transfer issues happen while testing the application, causing the team to rewrite the application repeatedly to achieve the speedup.

SUMMARY

A method of calculating feasibility of achieving a desired speedup of an application in a heterogeneous system, the method comprising of receiving the desired speedup of the application as input performing a static analysis and a dynamic analysis of the application wherein the dynamic analysis comprises identifying a set of parameters, the set of parameters being, an end-to-end execution time of the application, an execution time of data parallel loops in the application, an execution time of non-data parallel loops in the application, and an amount of physical memory used by each data structure in each data parallel loop; and also calculating feasibility of achieving the desired speedup of the application based on the identified set of parameters, and satisfaction of each of, an initialization Invariant, a data-parallel invariant and a data transfer invariant.

The method of calculating, wherein performing the static analysis comprises creating an intermediate representation of the application, identifying a set of control paths from the created intermediate representation.

The method of calculating, wherein performing the dynamic analysis further comprises generating a profile data of the application based on a given input.

The method of calculating, wherein the execution time of the data parallel loops corresponds to the execution time of a set of data parallel loops.

The method of calculating, wherein the application is presented as an input in its existing form.

The method of calculating, wherein static analysis of the control paths further comprises identification of data structures which are part of each identified data parallel loop and identification of a loop begin and a loop end of the application.

The method of calculating, wherein the profile data comprises number of iterations of each data parallel loop based on the given input, and the number of iterations of a set of data parallel loops.

The method of calculating wherein, the initialization invariant is satisfied when the desired execution time of the application is greater than the initialization time.

The method of calculating, wherein the data-parallel invariant is satisfied when a difference between an initialization time and the desired end-to-end execution time, is greater than the execution time of the non-data parallel loops.

The method of calculating, wherein the data transfer invariant is satisfied when a difference between desired end-to-end execution time and, the sum of the execution time of the non-data parallel loops and the initialization time, is greater than the data transfer time between a host processor and a co-processor's memory address space, for all iterations.

The method of calculating, wherein a prediction of a bandwidth utilization ratio of a data transfer bus is made based upon the dynamic analysis.

A computing system for calculating feasibility of achieving a desired speedup of an application in a heterogeneous system, the system comprising a memory and a processor comprising means configured to receiving the desired speedup of the application as input, performing a static analysis and a dynamic analysis of the application where the dynamic analysis comprises of identifying a set of parameters, the set of parameters being, an end-to-end execution time of the application, an execution time of data parallel loops in the application, an execution time of non-data parallel loops in the application, and an amount of physical memory used by each data structure in each data parallel loop and then calculating feasibility of achieving the desired speedup of the application based on the identified set of parameters, and satisfaction of each of, an initialization invariant, a data-parallel invariant and a data transfer invariant.

The computing system as disclosed above, wherein performing the static analysis comprises creating an intermediate representation of the application, identifying a set of control paths from the created intermediate representation.

The computing system as disclosed above, wherein performing the dynamic analysis further comprises generating a profile data of the application based on a given input.

The computing system as disclosed above, wherein the execution time of the data parallel loops corresponds to the execution time of a set of data parallel loops.

The computing system as disclosed above, wherein the application is presented as an input in its existing form.

The computing system as disclosed above, wherein static analysis of the control paths further comprises identification of data structures which are part of each identified data parallel loop and identification of a loop begin and a loop end of the application.

The computing system as disclosed above, wherein the profile data comprises number of iterations of each data parallel loop based on the given input and the number of iterations of set of data parallel loops.

The computing system as disclosed above, wherein the initialization invariant is satisfied when the desired execution time of the application is greater than the initialization time.

The computing system as disclosed above, wherein the data-parallel invariant is satisfied when a difference between an initialization time and the desired end-to-end execution time, is greater than the execution time of the non-data parallel loops.

The computing system as disclosed above, wherein the data transfer invariant is satisfied when a difference between desired end-to-end execution time and, the sum of the execution time of the non-data parallel loops and the initialization time, is greater than the data transfer time between a host processor and a co-processor's memory address space, for all iterations.

The computing system as disclosed above, wherein a prediction of a bandwidth utilization ratio of a data transfer bus is made based upon the dynamic analysis.

BRIEF DESCRIPTION OF THE DRAWINGS

The various embodiments of the invention will hereinafter be described in conjunction with the appended drawings, provided to illustrate, and not to limit, the invention, wherein like designations denote like elements, and in which.

DETAILED DESCRIPTION

Figure 1:
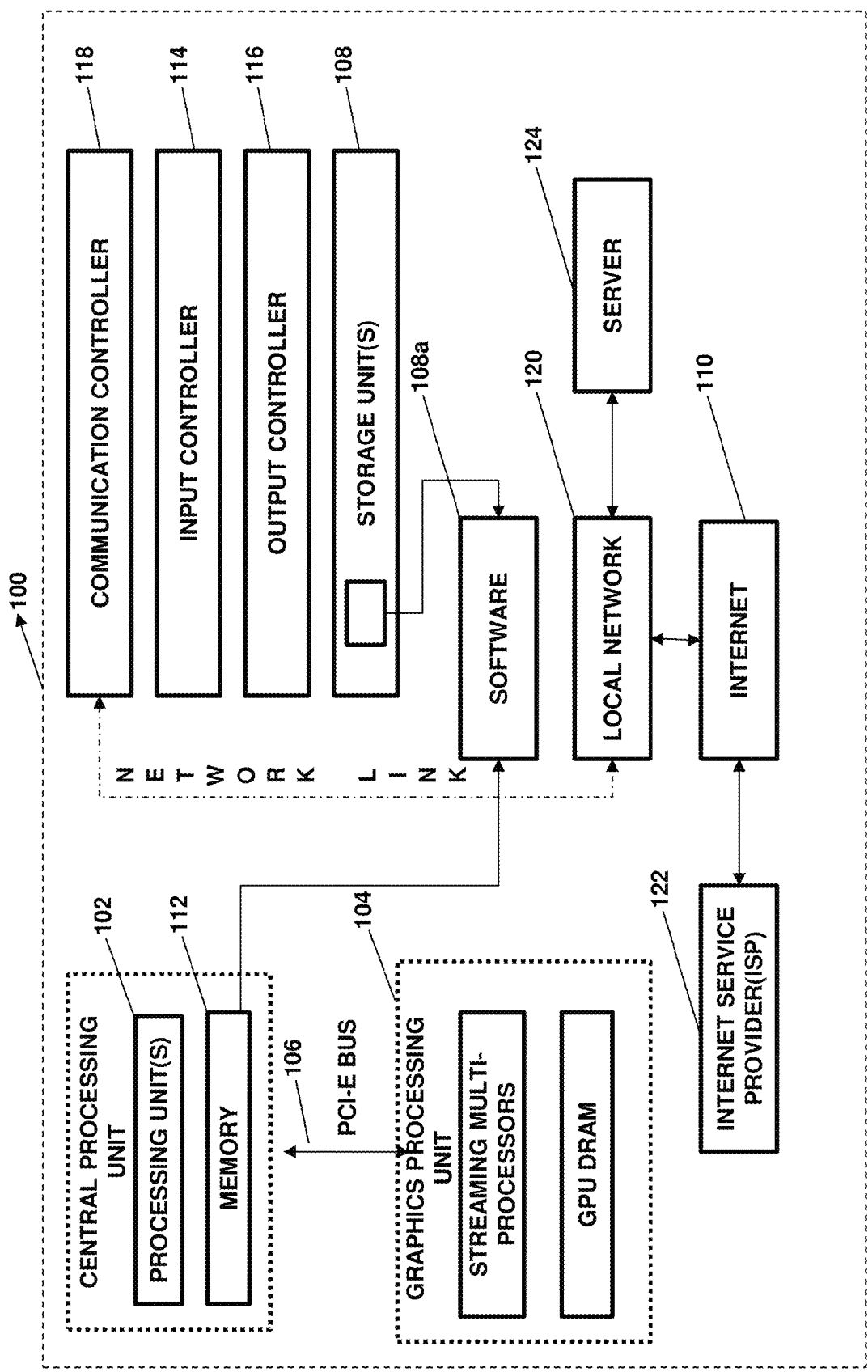
FIG. 1 illustrates a system in which various embodiments of the invention may be practiced, in accordance with an embodiment of the invention.

While the invention is susceptible to various modifications and alternative forms, specific embodiment thereof has been shown by way of example in the drawings and will be described in detail below. It should be understood, however that it is not intended to limit the invention to the particular forms disclosed, but on the contrary, the invention is to cover all modifications, equivalents, and alternative falling within the spirit and the scope of the invention as defined by the appended claims.

The steps in the methodology have been represented where appropriate by conventional symbols in the drawings, showing only those specific details that are pertinent to understanding the embodiments of the present invention so as not to obscure the disclosure with details that will be readily apparent to those of ordinary skill in the art having benefit of the description herein.

The terms "comprises", "comprising", or any other variations thereof, are intended to cover a non-exclusive inclusion, such that a process, method that comprises a list of steps does not include only those steps but may include other steps not expressly listed or inherent to such process, method. Similarly, one or more elements in a system or apparatus proceeded by "comprises . . . a" does not, without more constraints, preclude the existence of other elements or additional elements in the system or apparatus.

The features of the present invention are set forth with particularity in the appended claims. The invention itself, together with further features and attended advantages, will become apparent from consideration of the following detailed description, taken in conjunction with the accompanying drawings.
  i. The proposed solution provides a fast and reasonably accurate solution using which the application porting teams can estimate if the existing sequential application can be ported to GPU and get the desired speed-up. It also provides a guideline by performing static and dynamic analysis of the existing application in terms of the following, The amount of speed-up that the porting team needs to achieve in order to obtain the overall desired speed-up
  ii. The extent of data-transfer cost that one needs to reduce so as to get the desired speed-up.

This Approach Solves the Following Problems:
  i. Without having to port the application, the team knows upfront if the speedup is possible to obtain and what needs to be done to achieve the desired speedup. This approach saves the time required to first port and then discovers the feasibility.
  ii. The solution helps the team to formulate the right strategy to port.
  iii. Significantly reduces the effort to rewrite the ported application to achieve the desired speedup.

FIG. 1 (PRIOR-ART) is a block diagram of a computing device 100 to which the present disclosure may be applied according to an embodiment of the present disclosure. The system includes at least one processor 102, designed to process instructions, for example computer readable instructions (i.e., code) stored on a storage device 104. By processing instructions, processing device 102 may perform the steps and functions disclosed herein. 104 is a Graphics Processing Unit (GPU), which acts as a co-processor to the CPU. The data that is required by the GPU and on which GPU instructions are to be processed, is transferred from the CPU memory to the GPU Dynamic Random Access Memory (DRAM) via a PCIe bus (106). Storage device 108 may be any type of storage device, for example, but not limited to an optical storage device, a magnetic storage device, a solid state storage device and a non-transitory storage device. The storage device 108 may contain software 108a which is a set of instructions (i.e. code). Alternatively, instructions may be stored in one or more remote storage devices, for example storage devices accessed over a network or the internet 110. The computing device also includes an operating system and microinstruction code. The various processes and functions described herein may either be part of the microinstruction code or part of the program (or combination thereof) which is executed via the operating system.

Computing device 100 additionally may have memory 112, an input controller 114, and an output controller 116 and communication controller 118. A bus (not shown) may operatively couple components of computing device 100, including processor 102, memory 112, storage device 108, input controller 114 output controller 116, and any other devices (e.g., network controllers, sound controllers, etc.). Output controller 116 may be operatively coupled (e.g., via a wired or wireless connection) to a display device (e.g., a monitor, television, mobile device screen, touch-display, etc.) in such a fashion that output controller 116 can transform the display on display device (e.g., in response to modules executed). Input controller 114 may be operatively coupled (e.g., via a wired or wireless connection) to input device (e.g., mouse, keyboard, touch-pad, scroll-ball, touch-display, etc.) in such a fashion that input can be received from a user. The communication controller 118, is coupled to a bus (not shown) and provides a two-way coupling through a network link to the internet 110, that is connected to a local network 120, and operated by an internet service provider (hereinafter referred to as 'ISP') 122, which provides data communication services to the internet. Network link typically provides data communication through one or more networks to other data devices. For example, network link may provide a connection through local network 120 to a host computer, to data equipment operated by an ISP 122. A server 124 may transmit a requested code for an application through internet 110, ISP 122, local network 120 and communication controller 118. Of course, FIG. 1 illustrates computing device 100 with all components as separate devices for ease of identification only. Each of the components may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 100 may be one or more servers, for example a farm of networked servers, a clustered server environment, or a cloud network of computing devices.

A detailed explanation of the entire methodology is presented below. The same may be offered as a service to prospective clients/customers. In order to protect the confidentiality of the code's IP, use of a client-server model for assessment of the sequential code that is located on the client machine may be implemented.

Figure 2:
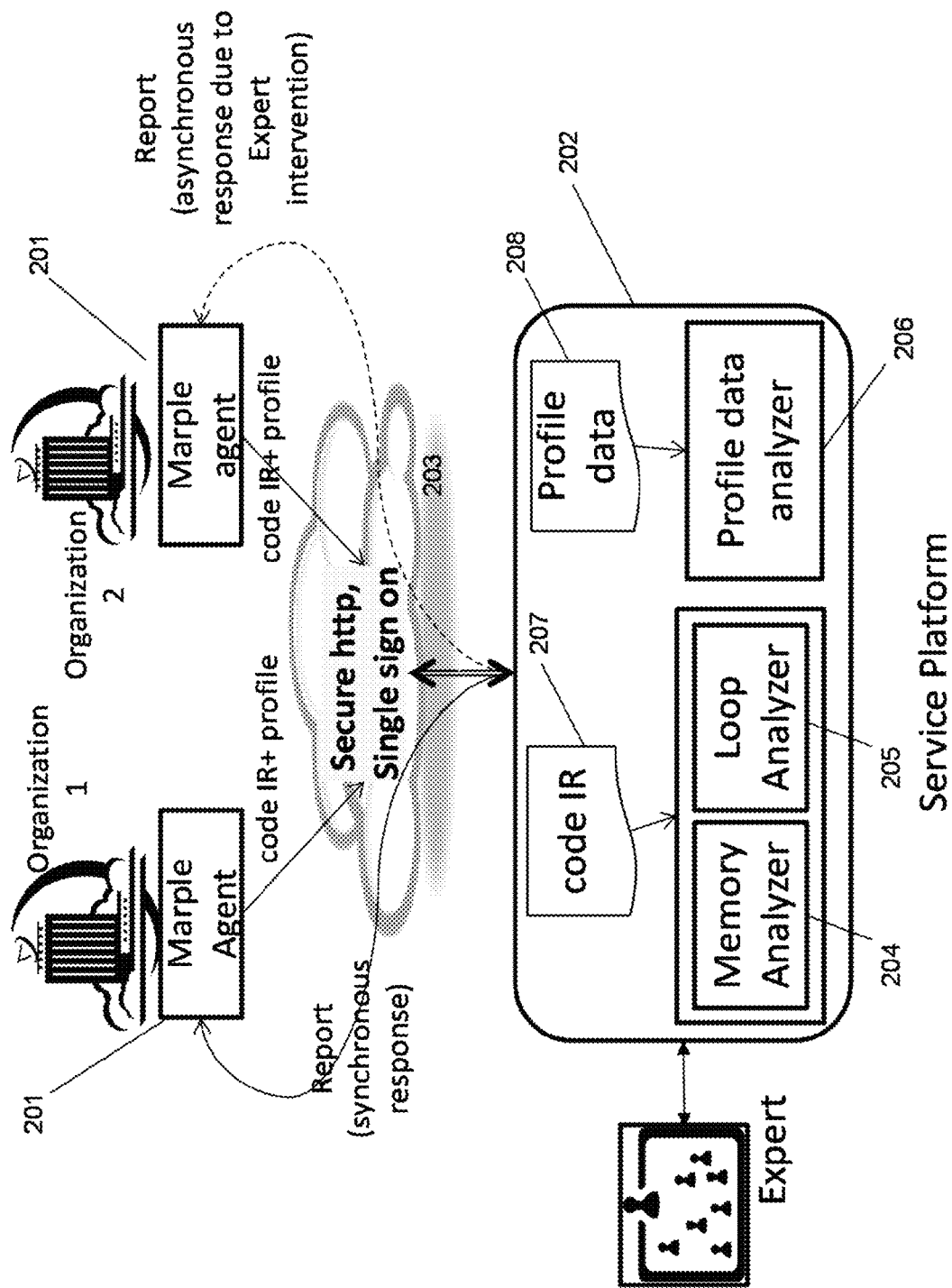
FIG. 2 illustrates an exemplary block diagram of a system for the conceived invention.

Describing one of the embodiments of the present invention as shown in FIG. 2, the MARPLE (Making Applications Ready for Parallel Execution) agent module (201) is installed at the client location, which is responsible for local computation and communication with the service platform (202). It maintains the session information and is responsible for secure communication over the network (203). It has capability to perform static as well as dynamic analysis on the sequential code running on the customer's machine. The output from the agent is code Intermediate Representation (IR) (207) and Profile data (208). This data is transferred to the service provider's servers using secure HTTP protocol.

As depicted in FIG. 2, the service provider's platform consists of a Memory Analyzer (204) and a Loop Analyzer (205) for analyzing code IR. The platform also has a Profile Data Analyzer (206) to analyze data generated through dynamic code analysis. Each of these analyzers are described in detail hereunder.

Memory Analyzer (204):

The IR code contains information regarding nature of program variables which is processed by the Memory Analyzer. Nature of program variables such as data types play a crucial role in not only determining the amount of GPU memory that may be used but also the way in which data needs to be stored in the GPU memory so as to optimize GPU memory access. For example, for data that does not get modified, it can be stored in a CPU's constant memory. Again, if the sequential code has data of type double stored in an array and if this data is being re-used, then on the GPU, to ensure that there are no bank conflicts when this data is accessed from the shared memory, requires some extra coding effort.

Loop Analyzer (205):

The code IR contains information regarding loop complexity, nature of program variables and information regarding data dependencies amongst program variables. Loop complexity and data dependencies amongst program variables are analyzed by the Loop Analyzer. Loop complexity is analyzed to understand the amount of control flow complexity that may exist in a program. This is important as it plays a crucial role to predict the kind of performance improvement one might observe when the sequential code is parallelized. As part of data dependency analysis, the loop analyzer determines flow dependencies and anti-dependencies that may exist between various program variables that are part of a loop. This information is important especially if there is a need to restructure loops in order to address control flow problems before an actual code transformation.

Profile Data Analyzer (206):

The profile data generated by a dynamic analysis of the code provides information regarding volume of a loop i.e. the number of times the data parallel loops in the sequential code would iterate for a given test input. Profile data also gives critical information regarding the different control flow paths that the program may take based on test data provided as input. Such branching behavior (often referred to as branch divergence problem in GPGPU parlance) can bring down the performance in a SIMT (single instruction multiple threads) code executing on a GPU. Hence information regarding patterns observed in branches taken by a program becomes important when trying to solve the branch divergence problem during actual code transformation. From the profile data, actual size of the input can be obtained. Since in GPGPU, data needs to be moved from the CPU to the GPU and vice versa, the size of the input plays a crucial role to determine whether this can be a bottleneck in the overall performance of the code. Analyzing this can help to determine whether overlapping computation with data transfer between CPU and GPU could be proposed as a solution for the GPU ready code. It may also be a good strategy to have data in page locked memory on the host rather than in pageable memory, so that a higher host to device or device to host data transfer bandwidth can be achieved.

The output of the above analysis is a report that gives an idea of how much speedup can be expected if this sequential implementation were to be made GPGPU ready. This report can be further used as an important input for building a tool that will do an actual code transformation. Also, this report can be used to estimate the cost of doing the code transformation. As can be seen, the above set of techniques offers a quick and acceptable solution to the challenges that had been discussed earlier.

Figure 3:
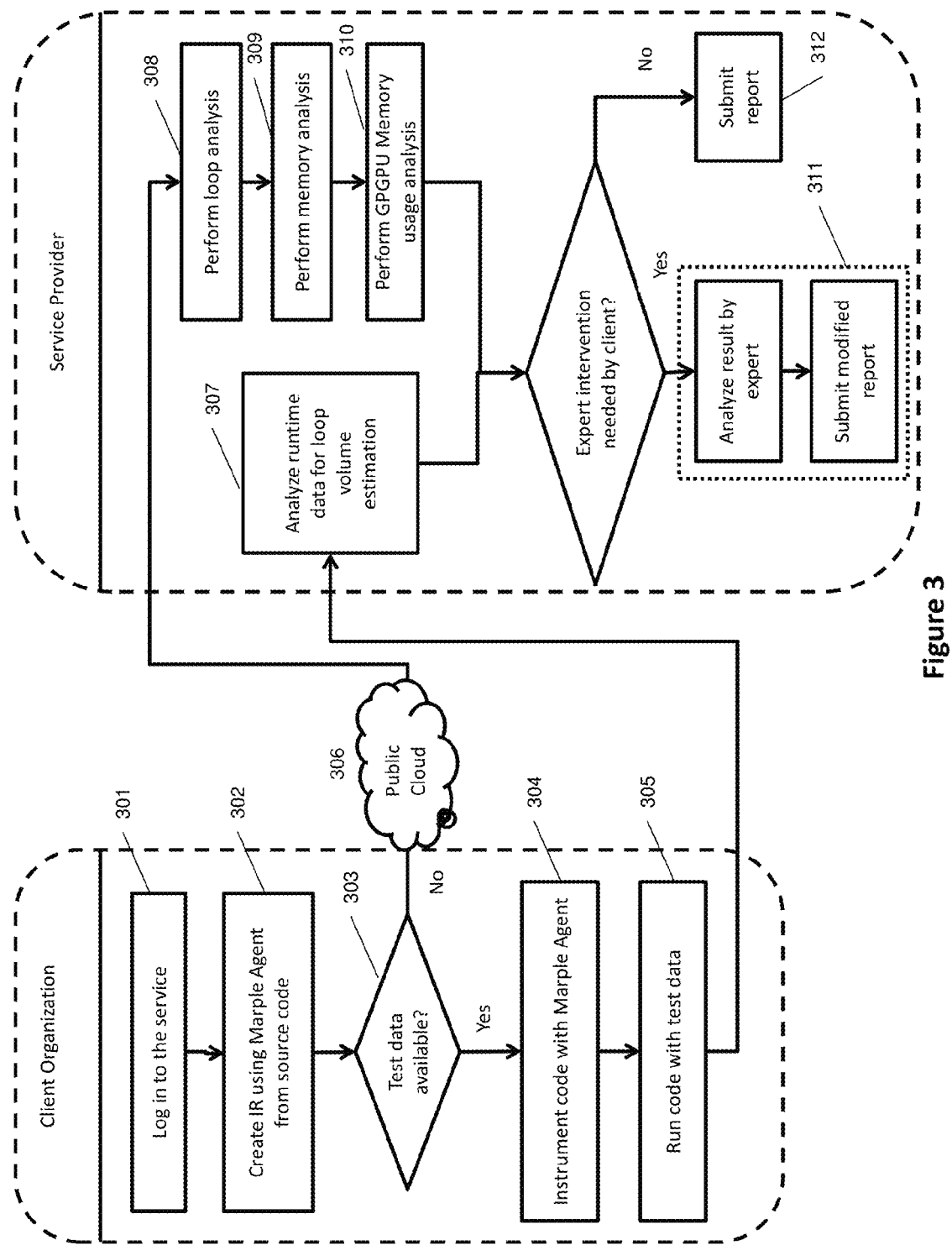
FIG. 3 illustrates the workflow that is executed at both client and service provider locations.

The flowchart of one of the embodiments of the proposed method is shown in FIG. 3.

The analysis is described below with the following assumptions:

a. A sequential implementation of an application that needs to be looked into for possible conversion to GPU ready code.
b. The MARPLE software agent is to be run at the client/customer end.
c. If dynamic analysis of the code is not possible, then at least the static analysis is to be performed on the code by the MARPLE software agent.
d. An encrypted communication channel is available between the client (where the MARPLE software agent collects the data for analysis) and the servers available with the service provider.

The sample inputs for the analysis is a Sequential code written in C/C++ or Java.

The workflow is executed at both client machines as well as at the servers available with the service provider as shown in FIG. 3. The steps of the complete analysis is explained in greater detail as here below.

The client invokes the MARPLE agent software to login (301) to the service.

The agent module will have a static analyzer framework for a specific programming language. There are several static analyzer frameworks available. As an example, a very well-known open-source framework called LLVM, which is supported by the industry leaders like NVIDIA and Apple Inc. is considered for the ease of explanation. Several MARPLE specific plugins may be incorporated on top of LLVM. These plugins may compile the client code and create an intermediate representation (302) called LLVM-IR. The format of LLVM-IR is publicly available.

MARPLE agent may insert specific markers at important parts of the intermediate representation, mostly at branches and loops.

If the test data is available (303), MARPLE agent may run the intermediate form with the test data at the client location. LLVM-IR provides complete support of running the intermediate form with the test data.

MARPLE agent may collect the runtime profile output (304) if the test data is available.

The agent may encrypt the IR as well as the profile output and send it to the service provider system (305).

The following steps are executed at the server side:

The server running on the public cloud (306), receives the encrypted IR and the profile output.

The server ensures multi-tenancy by keeping the client specific information in a dedicated partition (307). Virtualization technology may be leveraged here to achieve the partition. As an example, for each client, there may be a dedicated virtual machine (VM).

The Loop analyzer module analyzes (308) the IR using static analysis technique. The loop analyzer module may also make use of the profile output, if available.

The Memory Analyzer module analyzes (309) the IR as well as the profile output to identify various memory requirements (310) as explained earlier.

If an expert delineated analysis is solicited, the service module routes the report to the expert and notifies the expert to modify the report within a pre-defined time (311).

If expert delineated service is not solicited, the server sends the report to the client (312). If the client has asked for expert delineated service as described in the previous step, the server waits for the response from the expert and then sends the modified service to the client.

The output of the steps performed above is in the form of a report that provides the information regarding the extent to which the sequential code is data parallel in nature. The report may contain information regarding cylomatic complexity (the number of linearly independent paths in a source code) of a loop, the number of loop iterations, control flow, data dependencies of program variables and memory usage mapped to GPGPU memory model.

For the sake of explanation and to provide more clarity into the description provided above, the core modules of MARPLE Analyzer have been described below.

Data Flow Analyzer

The control flow analyzer module analyzes the program to identify various control paths, such as branches and loops. For the analysis described herein, the control flow analyzer only identifies the loop begin and end of a given program.

Control Flow Analyzer

The data flow analyzer module is used for the loops of the program that have been identified by the control flow analyzer. The data flow analysis module analyzes each loop body and determines whether a loop is a candidate for data-parallelism. The technique used to determine data-parallelism is well-known in the art.

Code Profiler

This module profiles the instrumented code as part of dynamic analysis. The output is a profiled data which may be used by the Execution time information collector. Additionally, the profiled data may also have information regarding the volume of each data parallel loop i.e. the number of times each data parallel loop in the sequential code may have iterated based on the given input as well as the volume of the outer body of the data parallel loops. Profile data may also give critical information regarding the different control flow paths the program may take based on the test data provided as input.

Execution Time Information Collector

The profiled data generated by the code profiler is analyzed by the execution time information collector to find the following:

End to end execution time

Execution time of identified data parallel loops

Execution time of non-data parallel loops. This information is utilized by the speedup estimation module.

Knowledgebase Inference Module

Information may be collected about the massively parallel co-processor on which the desired speedup is to be obtained

TABLE 1

| Attributes | Values (example NVidia) |
| --- | --- |
| Number of processor cores | 240 |
| Size of processor shared memory | 30*16384 bytes |
| Upper limit of the maximum shared memory per core | 16384 bytes |
| Max number of threads that can be run | 30720 |
| Upper limit on the threads that can be run on each core | 1024 |
| Total number of registers | 480K |
| Upper limit on register usage per core | 16K |
| Max PCIe bandwidth | 16 GB/s (bi-directional) |
| Size of memory | 4 GB |

In the above table, the attributes of a parallel co-processor are vendor agnostic. For the sake of explanation, shown values of these attributes are from a C1060 GPU from NVidia. For the estimation module described in this invention, PCIe information from the above table is used to obtain a metric that will determine the average PCIe bus utilization.

Speedup Estimation Module

Based upon the information obtained through static and dynamic analysis of code, the speedup estimation module evaluates whether a speedup by a factor of 'X' is possible based upon the following.

1. Satisfying of three invariants; namely Initialization Invariant, Data-parallel Invariant, Data-transfer Invariant.

2. Desired speedup required from all graphics co-processors.

Figure 4:
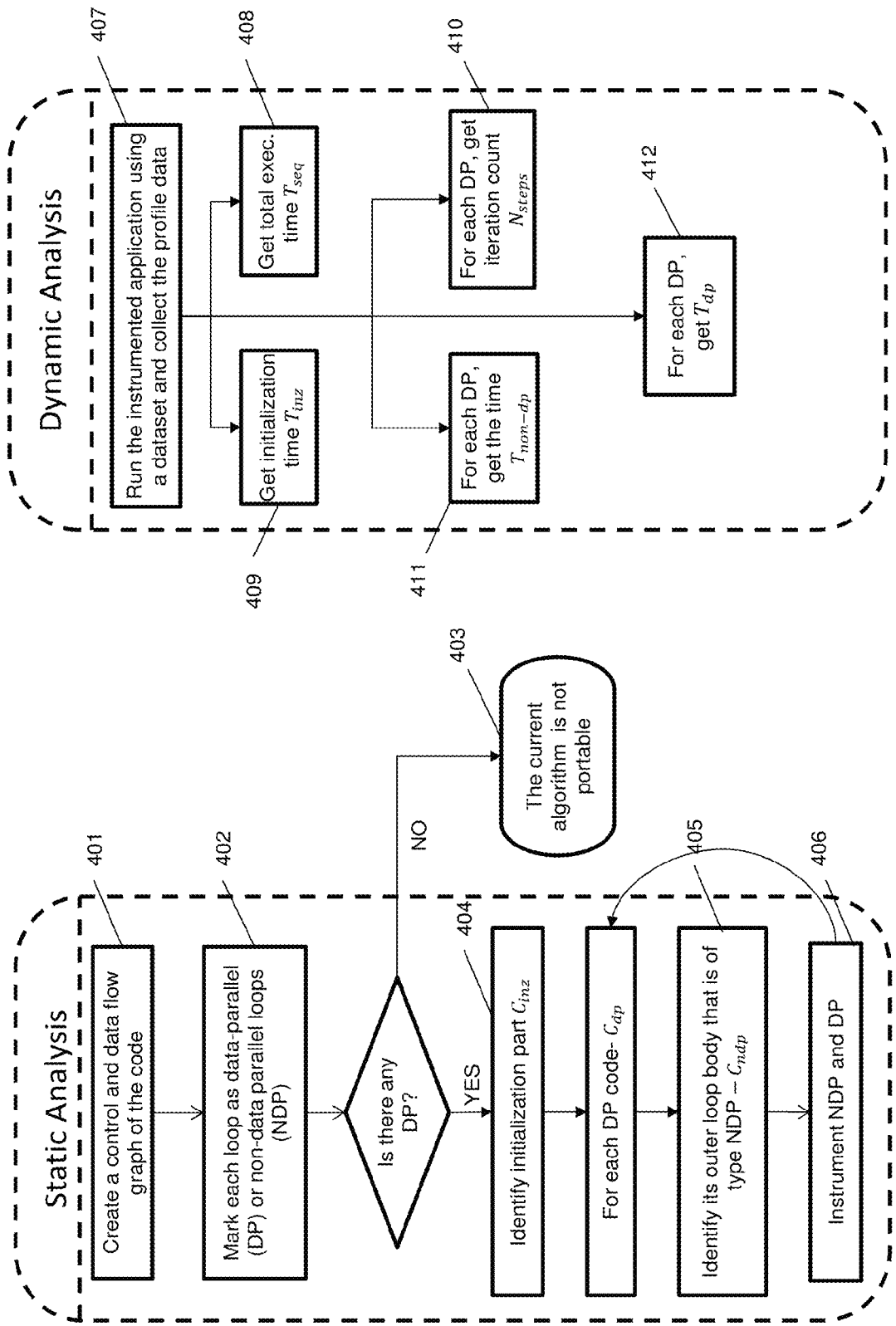
FIG. 4A illustrates the steps involved in static analysis of a sequential code.
FIG. 4B illustrates the steps involved in dynamic analysis of a sequential code.

In another embodiment of the present invention, it is described herein referring to FIG. 4 and based on the following assumptions:

The code under consideration implements an iterative solver algorithm

The code typically terminates after a data-dependent number of iterations

For a given codebase, and a given input, the iteration count is stable across multiple runs Static Analysis is performed on an inputs which is a Sequential code written in C/C++ or Java.

The steps involved in Static Analysis as shown in FIG. 4A are as follows.

The MARPLE analyzer may have a static analyzer framework for a specific programming language. There are several static analyzer frameworks available. As an example, a very well-known open-source framework called LLVM (Low Level Virtual Machine), which is supported by industry leaders such as NVIDIA and Apple Inc. has been considered. There may be several MARPLE specific plugins incorporated on top of LLVM. These plugins would compile the code and create an intermediate representation (IR) called LLVM-IR. The format of LLVM-IR is well known in the art.

A data flow graph of the code will be created (401) from the LLVM-IR.

The LLVM-IR will be used to identify those loops which are data parallel in nature (402). Each such loop will be annotated as as $C_{dp}$.

If the code has data parallel loops, then data structures such as arrays which are part of each data parallel loop will be identified. If no data parallel loop is present, then we will conclude that the code is not portable on a GPU and the analysis will stop (403).

The initialization part of the code will be identified from the intermediate representation and will be annotated as $c_{inz}$ (404).

For each data parallel loop, its outer loop body that is non-data parallel will be identified from the intermediate representation of the code and annotated as $c_{non-dp}$ (405).

For every data structure that was identified in an earlier step, the data flow graph will be used to find if any of them are of type read-only in both the data parallel loop and in the outer loop body.

Both the data and non-data parallel portions of the code will be instrumented for profiling the code with test data.

The output of the analysis is a source code instrumented (406) and compiled.

The inputs for the dynamic Analysis are the following

Instrumented and compiled code obtained from static analysis.

Test data

The steps as part of Dynamic Analysis as shown in FIG. 4B are as follows. The Instrumented code is run (407) on a data set to collect the run-time profile data of the application based on the test input. From the profile data the following will be identified.

Total time of execution ($T_{seq}$) (408).

Execution time for the initialization portion of the code ($T_{inz}$) (409).

Total number of iterations of the outer loop body ($N_{steps}$) (410)

Execution time of the non-data parallel portion of the code at any $i^{th}$ step of $N_{steps}$ ($T_{non-dp}$) (411)

Execution time of the data parallel portion of the code at any $i^{th}$ step of $N_{steps}$ ($T_{dp}$) (412)

Amount of data that is read from and written to each data structure of each data parallel loop in any $i^{th}$ step of $N_{steps}$.

The size of those data structures which are read-only in both the data parallel and non-data parallel portions of the code.

Output of Dynamic Analysis:
1. Time taken to execute the code end-to-end and time taken to run the initialization portion of the code.
2. Total number of iterations in the outer loop body
3. Time taken to execute the non-data parallel portion of the code.
4. Time taken to execute the data parallel portion of the code.

Estimation

The above evaluation is based on three invariants. It is described herein that if an application satisfies these three invariants, the application may be ported to GPU and may give the desired speedup. A preferred example of the approach is described as follows.

Let $T_{seq}$ be the end to end execution time of a single threaded implementation of any of these applications. Let the number of iterations that are required for the solution to converge be $N_{steps}$. Let the time taken for the initialization step be $T_{inz}$. Also the set of operations that are repeated again and again for convergence consists of two parts. One part is data parallel in nature and maybe ported to a GPU. The second part is non-data parallel in nature. Let the execution time of the data parallel portion of the code and the non-data parallel portion of the code in any $i^{th}$ step of $N_{steps}$ be $T_{dp}$ and $T_{non-dp}$ respectively.

Thus $$T_{seq} = T_{inz} + N_{steps} * (T_{dp} + T_{non-dp}) \quad (1)$$

If an end-to-end speedup by a factor of X (where X>1) is desired, then the new execution time of the modified code should be $$\frac{T_{seq}}{X}.$$

Assuming that speedup can only be achieved by placing the identified data parallel portion of the code on a GPU, let the desired execution time of this accelerated code be $T'_{dp}$. Thus, $$\frac{T_{seq}}{X} = T_{inz} + N_{steps} * (T'_{dp} + T_{non-dp}). \quad (2)$$

$$\text{Hence } T'_{dp} = \frac{\frac{T_{seq}}{X} - T_{inz}}{N_{steps}} - T_{non-dp}$$

Now, $T'_{dp}$ consists of execution time of all the graphics co-processors ($T_{GPU}$) as well as data marshaling costs from host to device ($T_{HtoD}$) and device to host ($T_{DtoH}$). Methodology to compute data marshaling cost from host to device ($T_{HtoD}$) and device to host ($T_{DtoH}$) is mentioned in step 3 below. Thus the desired execution time $T'_{dp}$ can be calculated as follows.

$$T'_{dp} = T_{GPU} + T_{HtoD} + T_{DtoH}. \text{ Hence } T_{GPU} + T'_{dp} - (T_{HtoD} + T_{DtoH}) \quad (3)$$

Using (2) and (3), $$T_{GPU} = \left(\frac{\frac{T_{seq}}{X} - T_{inz}}{N_{steps}} - T_{non-dp}\right) - (T_{DtoH} + T_{HtoD}) \quad (4)$$

This implies that if we have to get an end-to-end speedup by a factor X, then the required speedup ($\alpha$) of all the CUDA Kernels (The set of instructions that execute on the co-processor is compiled into a CUDA kernel) put together has to be $$\alpha = \frac{T_{dp}}{T_{GPU}} = \frac{\frac{T_{seq} - T_{inz}}{N_{steps}} - T_{non-dp}}{\left(\frac{\frac{T_{seq}}{X} - T_{inz}}{N_{steps}} - T_{non-dp}\right) - (T_{DtoH} + T_{HtoD})} \quad (5)$$

From (5), we can say that in order to get a desired speedup by a factor of X for an application end to end, the following three invariants need to be satisfied:

Initialization Invariant: This invariant indicates that the initialization phase of the algorithm should be sufficiently small so that the desired execution time of the ported application is still larger than the initialization time.

$$\frac{T_{seq}}{X} > T_{inz}$$

Data-parallel Invariant: This invariant indicates that the part of the code that's executed on the CPU for every iteration, should be sufficiently small. In particular, it must be $$\frac{\frac{T_{seq}}{X} - T_{inz}}{N_{steps}} > T_{non-dp}$$

Data-transfer Invariant: This invariant indicates that the overhead due to the transfer of data from CPU to the co-processor for parallel execution (typically through PCIe bus) should be sufficiently small $$\left(\frac{\frac{T_{seq}}{X} - T_{inz}}{N_{steps}} - T_{non-dp}\right) > (T_{DtoH} + T_{HtoD})$$

It may be observed that some data transfers from host to device need to be carried out as part of the initialization step. This is especially true for such data, which are read-only for GPU computations that are part of the iterative steps, and therefore can be transferred once from the host to the device as part of the initialization step (rather than moving them from the host to the device once per iteration). Such data structures have been identified in Static Analysis. In such scenarios, (5) can be modified to $$\alpha' = \frac{T_{dp}}{T'_{GPU}} = \frac{\frac{T_{seq} - T_{inz}}{N_{steps}} - T_{non-dp}}{\left(\frac{\frac{T_{seq}}{X} - T'_{inz}}{N_{steps}} - T_{non-dp}\right) - (T_{DtoH} + T'_{HtoD})}. \quad (6)$$

Here $T'_{inz} = T_{inz} + T''_{HtoD}$, $T''_{HtoD}$ is the time taken to move all such read only data from the host to device and can be determined from step 6 of Dynamic Analysis. $T'_{HtoD}$ is the modified host to device data transfer time in each time-step (obtained after excluding all such data transfers which can be done in the initialization step), $T'_{HtoD} = T_{HtoD} - T''_{HtoD}$.

Inputs for the Estimation Analysis are as given below $T_{seq}$, $T_{inz}$, $T_{non-dp}$, $T_{dp}$, $N_{steps}$ obtained from Dynamic Analysis.

Desired speedup X from the end user.

Figure 5:
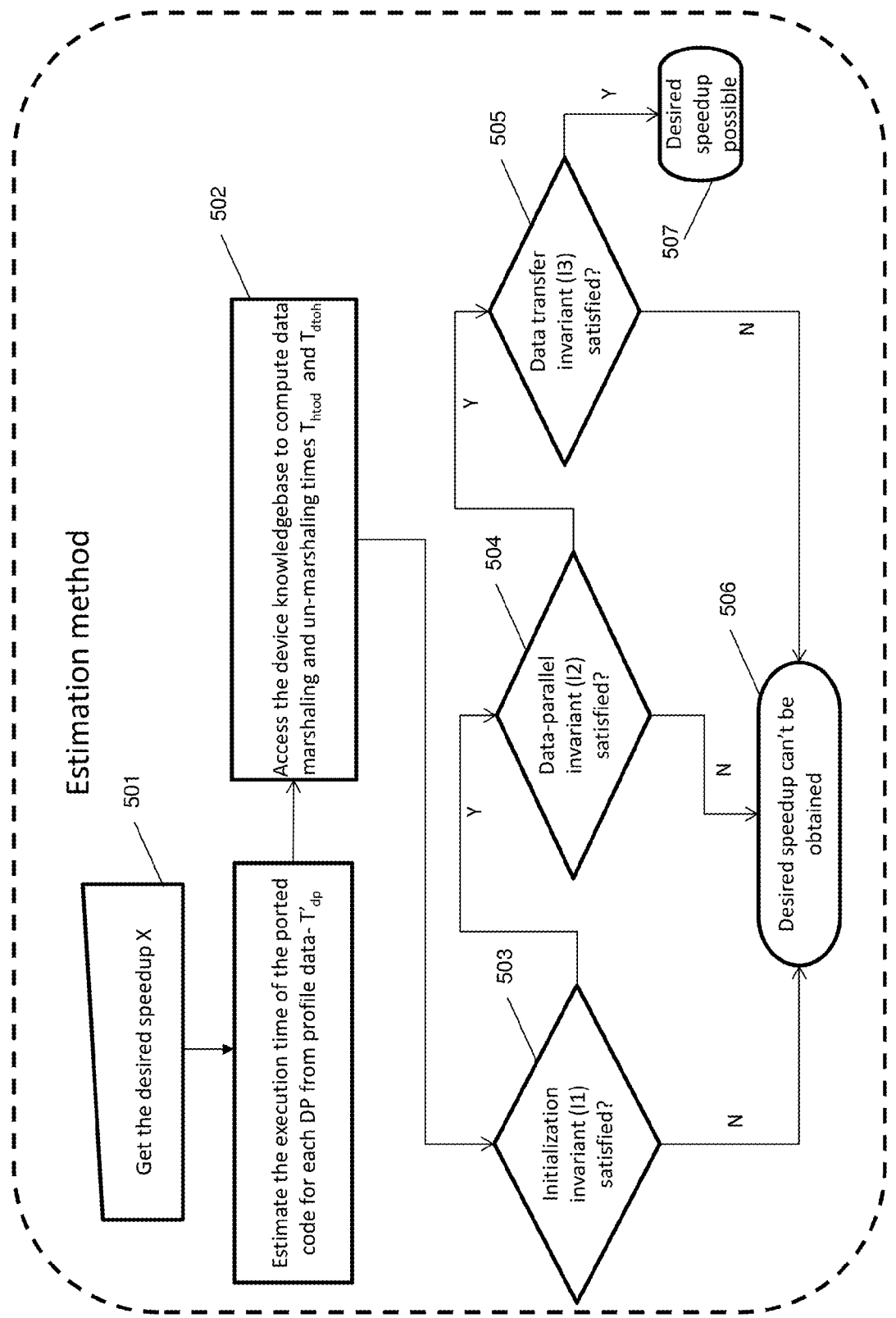
FIG. 5 illustrates the steps involved in the estimation methodology described in the invention.

The following steps in the estimation method are shown in FIG. 5.

Obtain the desired speedup X (501).

Obtain the total time of execution ($T_{seq}$) as mentioned in Dynamic Analysis.

The data marshaling cost from host to device ($T_{HtoD}$) is calculated as follows. From Dynamic Analysis, we identify the smallest size of data that is read from any data structure of any data parallel loop. We use this data size to empirically determine how much bandwidth will be utilized on the PCIe bus if this size of data had to be moved from the CPU DRAM to the GPU DRAM. We compute the data marshaling cost from the host to the device ($T_{HtoD}$) by dividing the total size of all such transfers in any $i^{th}$ step, by the empirically obtained bandwidth. The data marshaling cost from device to host ($T_{DtoH}$) is also calculated similarly, except that we now identify the smallest size of data that is written to any data structure of any data parallel loop (502).

The bandwidth obtained for host to device data transfers, is used to define the average bandwidth utilization ratio of the PCIe bus for such transfers.

$$\beta_{HtoD} = \frac{\left(\sum_{i=1}^{N_{steps}} Bandwidth_{HtoD}\right)/N_{steps}}{\text{Max}(Bandwidth_{HtoD})}.$$

Similarly, the bandwidth obtained for device to host data transfers, is used to define the average bandwidth utilization ratio of the PCIe bus for device to host data transfers.

$$\beta_{DtoH} = \frac{\left(\sum_{i=1}^{N_{steps}} Bandwidth_{DtoH}\right)/N_{steps}}{\text{Max}(Bandwidth_{DtoH})}.$$

The theoretical peak data transfer rate for device to host and host to device transfers can be obtained from the Knowledge base module.

Evaluate whether the Initialization invariant, Data-parallel invariant as well as Data-transfer invariant are satisfied or not using equations 1, 2 and 3 as described earlier (503,504,505).

If any of the above mentioned invariants are not satisfied, then the desired speedup X is not possible and the estimation method concludes (506).

If all the three invariants are satisfied, then the desired speedup X is achievable provided the required speedup of all graphics co-processors put together, ($\alpha$) is achievable (507).

Output:

A report that states whether an end-to-end desired speedup X is achievable based on satisfying of the three invariants. If the speedup is possible, the report also states what should therefore be the speedup necessary for all the CUDA kernels (The set of instructions that execute on the co-processor is compiled into a CUDA kernel) put together. Finally, the report also mentions the average bandwidth utilization ratio for host to device and device to host transfers.

In addition to or in conjugation with the description of the invention with respect to the drawings enclosed herein, embodiments of the present invention also disclose the aspects as described above. Although the description above is directed towards explaining the invention in view of a graphics co-processing unit, the same can be extended to other heterogeneous systems.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

We claim:

1. A method of calculating feasibility of achieving a desired speedup of an application in a heterogeneous system, the method comprising:

receiving the desired speedup of the application as input;
performing a static analysis via a computing system comprising one or more processors, of the application to obtain instrumented and compiled code;
performing a dynamic analysis, via the computing system, of the instrumented and compiled code, wherein the dynamic analysis comprises:
identifying a set of parameters, the set of parameters comprising:
an end-to-end execution time of the application,
an execution time of data parallel loops in the application,
an execution time of non-data parallel loops in the application, and
an amount of physical memory used by each data structure in each data parallel loop; and
calculating feasibility of achieving the desired speedup of the application based on the identified set of parameters, and satisfaction of each of, an initialization invariant, a data-parallel Invariant and a data transfer invariant.

2. The method as claimed in claim 1, wherein performing the static analysis comprises:
creating an intermediate representation of the application;
identifying a set of control paths from the created intermediate representation.

3. The method as claimed in claim 1, wherein performing the dynamic analysis further comprises generating a profile data of the application based on a given input, the profile data comprising:
number of iterations of each data parallel loop based on the given input; and
the number of iterations of the set of data parallel loops.

4. The method as claimed in claim 1, wherein the execution time of the data parallel loops corresponds to the execution time of a set of data parallel loops.

5. The method as claimed in claim 2, wherein static analysis of the control paths further comprises:
identification of data structures which are part of each identified data parallel loop; and
identification of a loop begin and a loop end of the application.

6. The method as claimed in claim 1, wherein the initialization invariant is satisfied when the desired execution time of the application is greater than the initialization time.

7. The method as claimed in claim 1, wherein the data-parallel invariant is satisfied when a difference between an initialization time and the desired end-to-end execution time, is greater than the execution time of the non-data parallel loops.

8. The method as claimed in claim 1, wherein the data transfer invariant is satisfied when a difference between desired end-to-end execution time and, the sum of the execution time of the non-data parallel loops and the initialization time, is greater than the data transfer time between a host processor and a co-processor's memory address space, for all iterations.

9. The method as claimed in claim 1, wherein a prediction of a bandwidth utilization ratio of a data transfer bus is made based upon the dynamic analysis.

10. A computing system for calculating feasibility of achieving a desired speedup of an application in a heterogeneous system, the system comprising:
a memory; and
a processor configured to:
receiving the desired speedup of the application as input;
performing a static analysis of the application to obtain instrumented and compiled code;
performing a dynamic analysis of the instrumented and compiled code, wherein the dynamic analysis comprises
identifying a set of parameters, the set of parameters comprising:
an end-to-end execution time of the application,
an execution time of data parallel loops in the application,
an execution time of non-data parallel loops in the application, and
an amount of physical memory used by each data structure in each data parallel loop; and
calculating feasibility of achieving the desired speedup of the application based on the identified set of parameters, and satisfaction of each of, an initialization Invariant, a data-parallel Invariant and a data transfer invariant.

11. The computing system as claimed in claim 10, wherein performing the static analysis comprises:
creating an intermediate representation of the application;
identifying a set of control paths from the created intermediate representation.

12. The computing system as claimed in claim 10, wherein performing the dynamic analysis further comprises generating a profile data of the application based on a given input, the profile data comprising:
number of iterations of each data parallel loop based on the given input; and
the number of iterations of the set of data parallel loops.

13. The computing system as claimed in claim 10, wherein the execution time of the data parallel loops corresponds to the execution time of a set of data parallel loops.

14. The computing system as claimed in claim 10, wherein the application is presented as an input in its existing form.

15. The computing system as claimed in claim 11, wherein static analysis of the control paths further comprises:
identification of data structures which are part of each identified data parallel loop; and
identification of a loop begin and a loop end of the application.

16. The computing system as claimed in claim 10, wherein the initialization invariant is satisfied when the desired execution time of the application greater than the initialization time.

17. The computing system as claimed in claim 10, wherein the data-parallel invariant is satisfied when a difference between an initialization time and the desired end-to-end execution time, is greater than the execution time of the non-data parallel loops.

18. The computing system as claimed in claim 10, wherein the data transfer invariant is satisfied when a difference between desired end-to-end execution time and, the sum of the execution time of the non-data parallel loops and the initialization time, is greater than the data transfer time between a host processor and a co-processor's memory address space, for all iterations.

19. The computing system as claimed in claim 10, wherein a prediction of a bandwidth utilization ratio of a data transfer bus is made based upon the dynamic analysis.

20. A computer program product comprising a non-transitory computer-readable medium having a computer-readable program product embodied therein for calculating feasibility of achieving a desired speedup of an application in a heterogeneous system, wherein the computer readable program product comprises program instructions causing a computer to perform a method comprising:

receiving the desired speedup of the application as input;

performing a static analysis of the application to obtain instrumented and compiled code;

performing a dynamic analysis of the instrumented and compiled code, wherein the dynamic analysis comprises:

identifying a set of parameters, the set of parameters comprising:

an end-to-end execution time of the application, an execution time of data parallel loops in the application, an execution time of non-data parallel loops in the application, and an amount of physical memory used by each data structure in each data parallel loop; and calculating feasibility of achieving the desired speedup of the application based on the identified set of parameters, and satisfaction of each of, an initialization invariant, a data-parallel invariant and a data transfer invariant.

21. The computer program product as claimed in claim 20, wherein performing the static analysis comprises:

creating an intermediate representation of the application; and identifying a set of control paths from the created intermediate representation;

and performing the dynamic analysis comprises generating a profile data of the application based on a given input, the profile data comprising:

number of iterations of each data parallel loop based on the given input, and the number of iterations of the set of data parallel loops.

* * * * *